Figure 1:
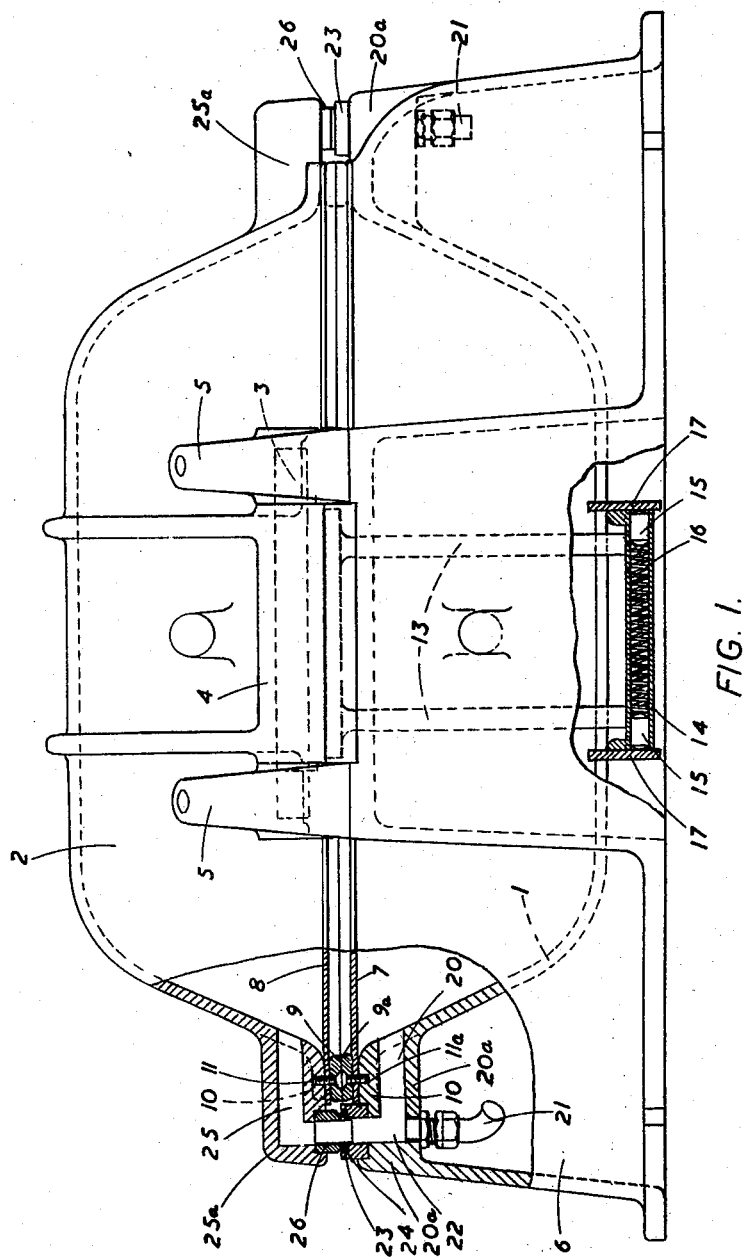

July 29, 1958

G. W. TAYLOR ET AL 2,844,853

APPARATUS FOR PRODUCING SHELL MOLDS

Filed June 2, 1953

5 Sheets-Sheet 2

Inventors
George William Taylor
John Edward Worthington
Michael John Sargeaunt

By Richardson, Daviand Nordon
their Attorneys.

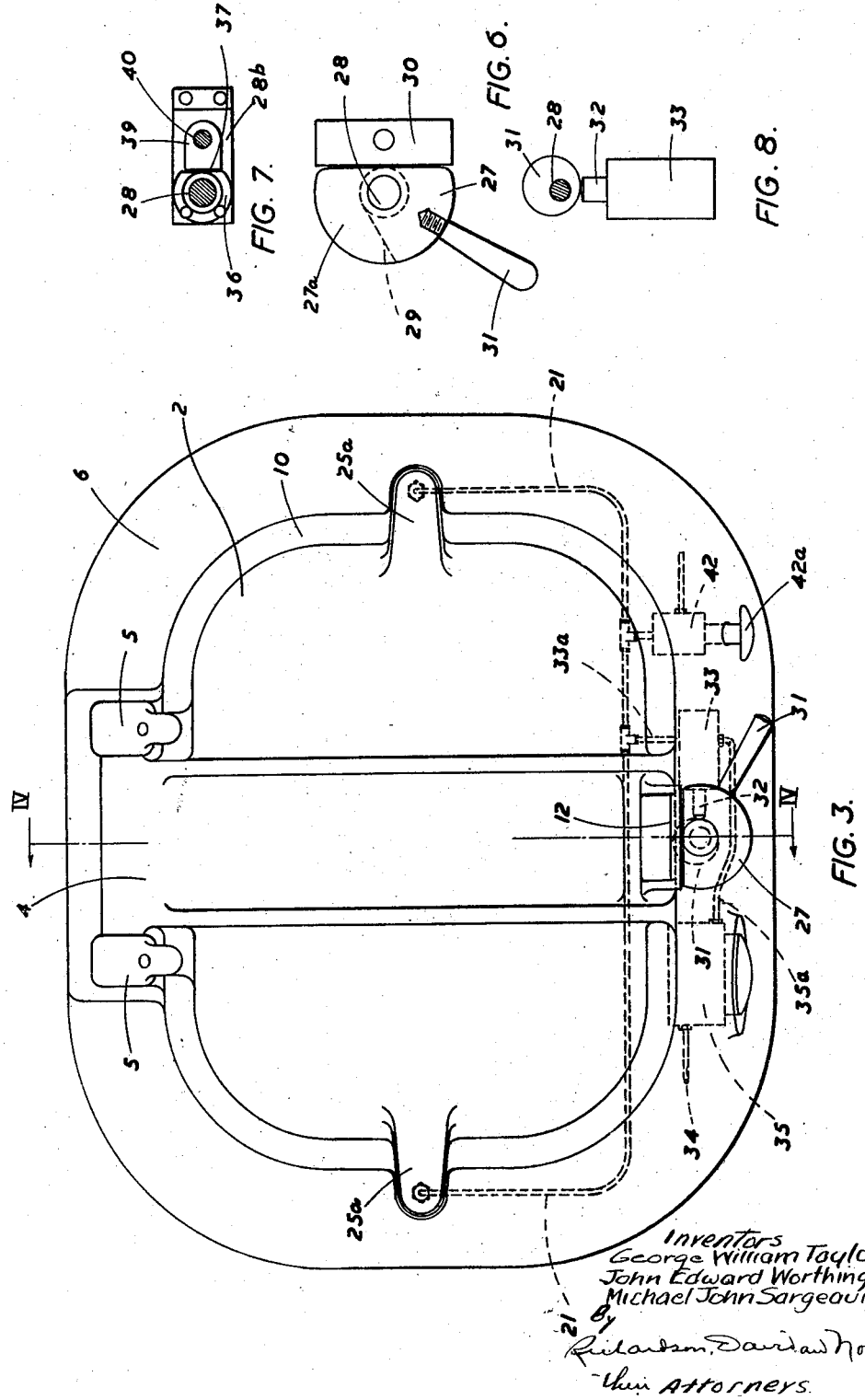

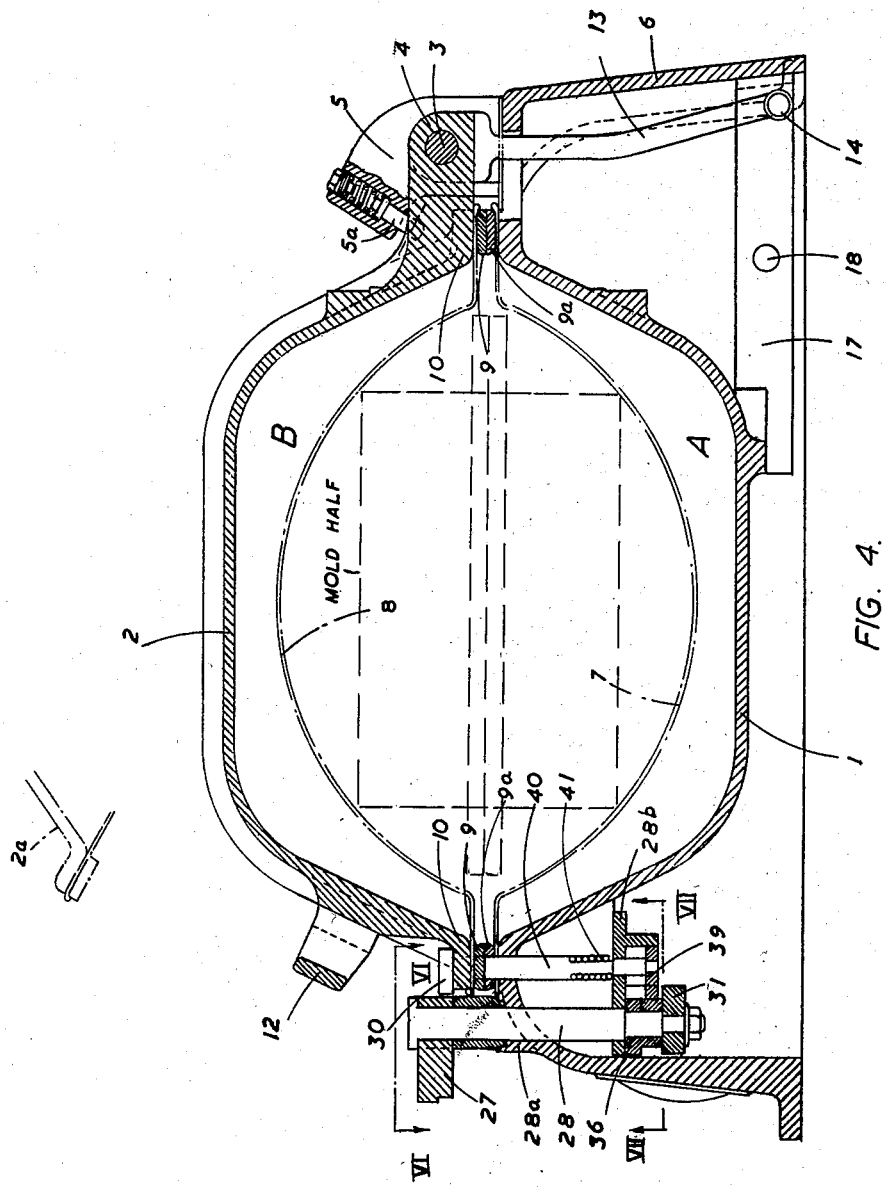

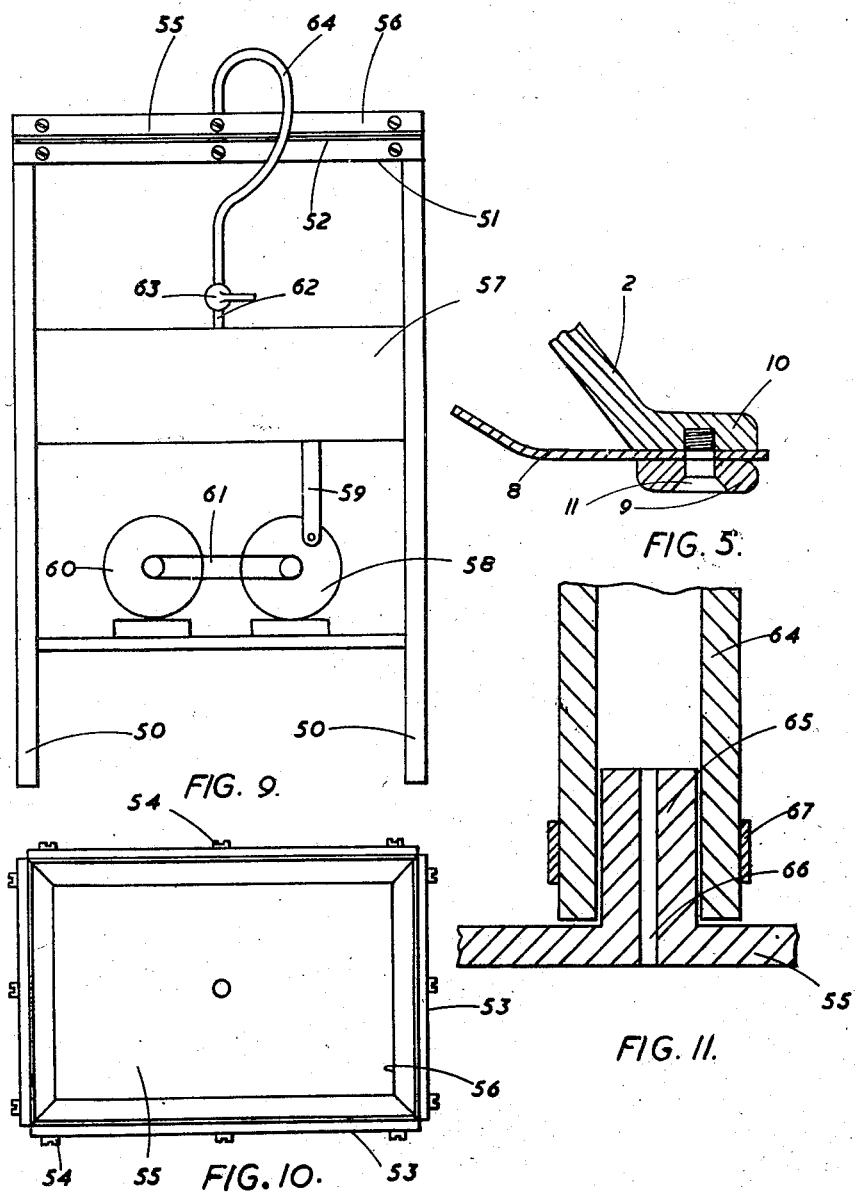

United States Patent Office 2,844,853
Patented July 29, 1958

2,844,853
APPARATUS FOR PRODUCING SHELL MOLDS

George William Taylor, Staines, John Edward Worthington, Whitton, and Michael John Sargeaunt, London, England, assignors to Polygram Casting Co. Limited, London, England Application June 2, 1953, Serial No. 359,062
Claims priority, application Great Britain February 26, 1953
1 Claim. (Cl. 22—31)

This invention relates to methods of and apparatus for producing a shell mold from two half molds.

Half shell molds are produced, for example, as described in British patent specification No. 674,421 by applying to a heated pattern a molding mixture consisting of sand and a thermosetting binder, whereby a coating of the mixture is formed on the pattern, and partially sets, the pattern with the adherent coating being further subjected to heat to complete the setting of the coating. The latter is then stripped from the pattern, which is initially coated with a stripper material to enable the removal of the set coating of molding mixture therefrom.

The coating when removed from the pattern constitutes one half of a shell mold.

The pattern is formed integral with or is mounted on a pattern plate or carrier, and the portion of the coating which defines the half mold cavity is continued by a surround or flange of the set molding material. Molded on these flanges there may be on one half mold recesses and on the other half projections to facilitate the assembly of the two mold halves in the correct registration. Alternatively corresponding recesses may be molded on the flanges of each half mold into which dowels may be inserted to facilitate assembly in exact registration of the two mold halves.

Hitherto two half molds have been held together, to form a complete mold for casting purposes, by means of mechanical devices such as bolts, clamps, clips, springs or bent iron nails or a combination of such devices applied to hold two flanges or mating portions together. The use of such devices not only consumes time and labor, but also does not always ensure a sufficiently close mating of the flanges of the two halves of the mold to enable accurate castings to be produced.

The present invention has for its object to provide an improved method of and apparatus for holding together the two halves of a shell mold which will obviate the above disadvantages and by means of which distortion which may be present in the mating portions of the two halves can be reduced or eliminated and close contact between them obtained.

According to the present invention a method of making a shell mold from two half molds consists in placing the mating faces of the two half molds together, with the shaped portions thereof in registration and with an adhesive between the mating portions and exerting pressure upon the outer surfaces of the half molds through the intermediary of a gas, or a liquid until the adhesive has set sufficiently to hold the two half molds together. The pressure is then released in order to remove the assembled mold.

As shell molds are pervious to gases and liquids the pressure can be applied to them through the intermediary of a flexible diaphragm which is impervious to the fluid employed.

The pressure may be exerted by placing the assembly of the two half molds, with the adhesive between the two mating portions of the flanges between a pair of flexible diaphragms. Each diaphragm is mounted so as to form one side of a vessel the rest of which is rigid and pressure can be applied to the diaphragm and thereby to each half mold by introducing a gas or liquid under pressure into the vessels. Means can be provided for moving the two diaphragms towards or away from one another to facilitate the insertion of the mold assembly between them and its removal after the adhesive has set.

Pressure can also be applied through two flexible bags or envelopes containing a gas or liquid which are brought into contact with the two outside surfaces of the mold by any convenient means such as the force of gravity; a hand, foot or power-operated system of leverage or by a pneumatic or hydraulic or electrical system operating through a cylinder or otherwise.

Alternatively the assembly of the two mold halves may be placed within a flexible envelope from which air can be evacuated thereby causing the envelope to collapse on to the two mold halves which are held together by atmospheric pressure until the adhesive has set sufficiently to hold the two mold halves together.

By these methods the parts of the diaphragms or envelopes which are in contact with the assembly of mold halves, take up the shape of the assembly and thus the pressure exerted on the envelopes becomes transmitted uniformly to the mold halves.

After the adhesive is set sufficiently the pressure is released in all the above cases.

Where the mold assembly is to be placed within an envelope as described above, the envelope may be made in two halves, each comprising a sheet of flexible material, for example, rubber, surrounded by a rigid frame. One or both of the sheets has a connector or connectors for the attachment of a pipe or pipes through which suction may be applied. These frames are brought togther to enclose the mold assembly, the mating faces of the frames being constructed so as to be gas-tight when brought together, and the air is then exhausted from between them by means of the said pipe or pipes.

Figure 2:
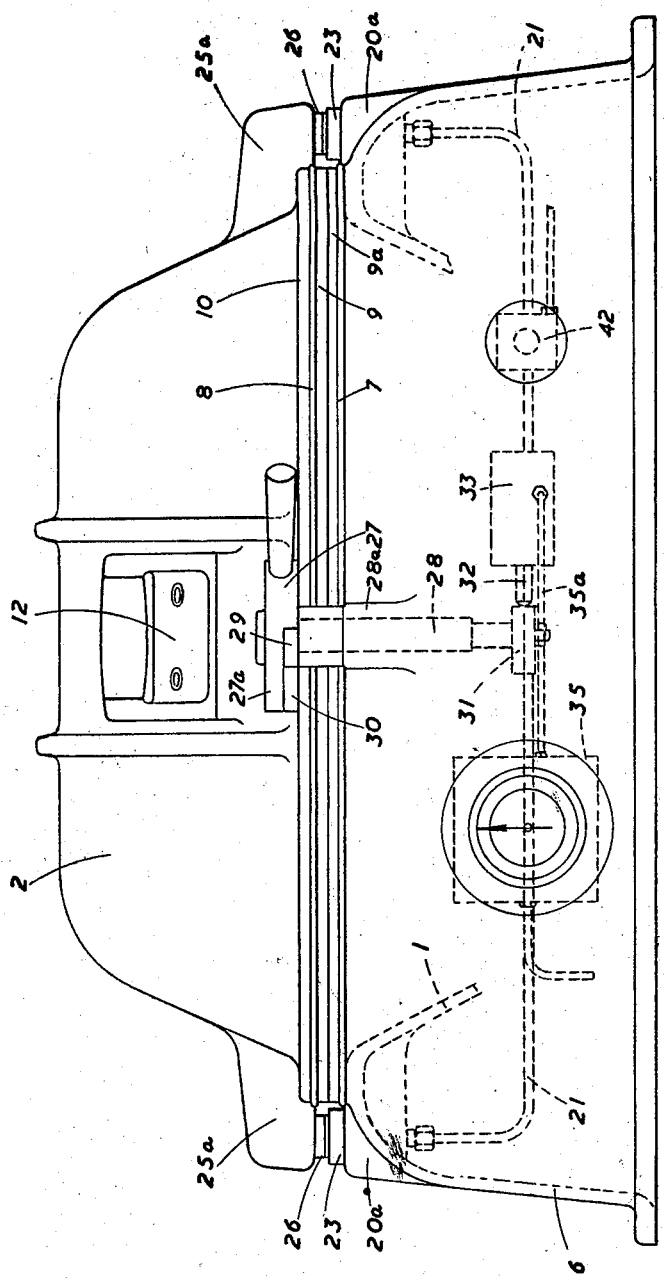

In order that the invention may be more completely understood two embodiments thereof will now be described by way of example with reference to the accompanying diagrammatic drawings in which:

Figure 1 illustrates one embodiment in rear elevation, part being shown in section, Figure 2 shows a front elevation of the apparatus illustrated in Figure 1, Figure 3 is a plan on a smaller scale, of the apparatus illustrated in Figure 2, Figure 4 shows a section on the line IV—IV in Figure 3, Figure 5 is a detail view showing the manner of attachment of a diaphragm to a casing forming part of the apparatus illustrated in Figures 1 to 4, Figure 6 is a partial plan view on the line VI—VI in Figure 4, Figure 7 is a part sectional view on the line VII—VII in Figure 4, Figure 8 is a detail view showing a compressed air control valve and its operating cam, and Figures 9 to 11 illustrate a second embodiment of the invention.

Referring to Figures 1 to 8 the apparatus illustrated therein comprises a lower casing 1 having an upper casing 2 hinged thereto by a hinge pin 3 passing through a boss 4 integral with the upper casing 2 and having its ends engaging in holes in lugs 5 carried by the lower casing 1, which is formed integral with the base 6.

A flexible diaphragm 7 e. g. of rubber is attached by its edges to the periphery of the lower casing 1 and a second flexible diaphragm 8 is likewise attached to the periphery of the upper casing 2.

Each casing, with its diaphragm thus constitutes a vessel, of which one side (the casing) is rigid while the other side (the diaphragm) is flexible.

The diaphragm 8 is attached to the upper casing 2 by a metal strip 9 (Figure 5) having the same shape as the casing periphery and attached to a peripheral flange 10 on the casing by screws 11 which clamp the edge of the diaphragm between the strip and the flange.

In like manner the diaphragm 7 is attached by means of a peripheral metal strip 9a and screws 11a to the peripheral part 10a of the lower casing 1.

The flexibility and size of the diaphragms 7 and 8 are such that the diaphragms can be separated as indicated in chain lines in Figure 4 so that a mould assembly can be accommodated between them.

The upper casing 2 carries a handle 12 for raising it and means are provided for holding the upper casing 2 in the open position when required. To this end the boss 4 on the upper casing carries two arms 13 depending into the base and carrying between them a tube 14 within which are disposed two plungers 15 urged outwardly by a spring 16 (Figures 1 and 4).

When the casing 2 is closed down on to casing 1 the plungers engage dimples (not shown) in two plates 17 fixed to the base of the apparatus whereas when the casing 2 is raised to the open position (indicated in part in chain lines at 2a) the arms 13 are rocked clockwise until plungers 15 engage dimples 18 (one shown) in the plates 17.

A spring buffer 5a is mounted in each of the lugs 5 (Figure 4) against which engages the flange 10 of the casing 2 when the latter is opened.

Each of the casings 1 and 2 is provided with an air port at each of its sides. The air ports for one side are shown in section at the left hand side of Figure 1.

The air port 20 to the lower casing 1 is formed in a part 20a which is integral with the lower casing 1, and said port 20 communicates with an air supply pipe 21, and has a branch 22 leading to an internally conical seating element 23 mounted in the periphery of the casing 1, said seating having a groove in which is located a sealing ring 24.

The air port 25 for the upper casing 2 is formed in a boss 25a integral with the upper casing and communicates with an externally conical connector element 26 mounted in the periphery of the upper casing 2, the conical part of this connector engaging in the internally conical seating element 23 when the casings 1 and 2 are brought together.

By this means air can be admitted to the interior A of the vessel formed by casing 1 and diaphragm 7 from pipe 21 through port 20, and simultaneously through branch 22, through connector 26 and port 25 to the interior B of the vessel formed by casing 2 and diaphragm 8.

At the front of the apparatus there is provided a clamp for holding the two casings 1 and 2 together.

The clamp is in the form of a disc 27 secured to a spindle 28 and having its under-side cut away over the part of the disc indicated at 27a to leave a stop face 29. Spindle 28 is rotatably mounted in a boss 28a and a plate 28b fixed to the casing 1. Attached to the peripheral flange 10 of the upper casing 2 is a plate 30. Clamping is effected by rotating disc 27 clockwise (Figure 3) by means of handle 31, so that the part 27a of disc 27, passes over the plate 30 to effect the clamping, the movement being limited by engagement of stop face 29 with the edge of plate 30.

The actuation of the clamp also turns on the air supply to the casings 1 and 2 and to this end the following mechanism is provided.

The lower end of spindle 28 carries a cam 31 which, when the spindle 28 is rotated to effect clamping, actuates a plunger 32 to open a valve 33 to admit air from a main supply pipe 34, through pressure regulator 35, pipe 35a, valve 33 and pipe 33a to pipe 21 leading to the ports 20 and 25 for admitting air to the casings 1 and 2.

In order to prevent actuation of valve 33 while the casing 2 is raised, a locking device for the spindle 28 is provided which is released when the casing 2 is brought down to the closed position.

The locking device is constructed as follows.

Secured to spindle 28 is a disc 36 (Figures 4 and 7) having a flat 37 with which co-operates a locking member 39 secured to the lower end of a plunger 40 urged upwardly by a spring 41.

When the casing 2 is open the upper end of plunger 40 projects through the casing 1 and through the strip 9a carried thereby. In this position of the plunger the locking member 39 is in the same plane as the disc 36 and engages the flat 37 thereon, thereby preventing rotation of spindle 28. When casing 2 is lowered to closed position the strip 9 thereon pushes the plunger 40 downwardly into the position shown in Figure 4 in which it is clear of the disc 36 and thus releasing spindle 28 for operation.

To release the pressure a plunger 42a is provided which actuates a valve 42 connected to pipe 21, to connect the latter to atmosphere.

When using the apparatus shown in Figures 1 to 8 the upper casing 2 is swung upwardly to the open position (indicated in part in broken lines at 2a in Figure 4) and the assembly of the two mold halves with the adhesive between their mating surfaces is placed on the lower diaphragm 7.

The upper casing 2 is then lowered until its rests upon the lower casing 1, this operation serving to depress plunger 40 and thereby release the spindle 28.

The clamp 27 is then rendered effective by turning the spindle 28 clockwise in Figure 3 this operation also serving, by means of cam 31 to operate valve 33 to admit compressed air to the interiors A and B of the vessels respectively constituted by casing 1 and diaphragm 7, and casing 2 and diaphragm 8, whereby pressure is applied to the mold halves through the diaphragms.

After the pressure has been thus applied for a time sufficient to allow the adhesive to set, the plunger 42a is pressed to open valve 42 to atmosphere, thereby releasing the pressure in the interiors A and B of the two vessels. The spindle 28 is then turned counterclockwise (Figure 3) to release the clamp 27 and to operate valve 33 to shut off the air supply.

The casing 2 is then raised and the mould assembly removed. Raising of the casing 2 exposes the ports 20 and 25 to atmosphere, through the seating 23 and connector 26, through which air in the spaces A and B may readily be exhausted by pressure on the diaphragms 7 and 8.

Referring now to Figures 9 to 11, the apparatus illustrated therein comprises a rectangular stand including four legs 50 (two shown) supporting at their upper ends a frame 51 carrying a diaphragm 52, for example of rubber.

For cooperation with the fixed diaphragm 52 there is provided a removable diaphragm 55 carried by a frame 56 of the same shape and dimensions as the frame 51.

The edges of the diaphragm 55 are turned over the edges of the frame 56 and secured thereto by metal strips 53 attached to the frame 56 by screws 54.

Diaphragm 52 is attached to frame 51 in the same manner as that in which diaphragm 55 is attached to frame 56.

Supported between the legs 50 is a vacuum tank 57 in which a vacuum can be maintained by a vacuum pump 58 connected to the tank by pipe 59 and driven by an electric motor 60 through belt 61.

The vacuum tank 57 has an outlet pipe 62 provided with a control valve 63, and to which is connected a flexible hose 64 attached to the movable diaphragm 55 for example by vulcanising, or as shown in Figure 11. In the construction shown in Figure 11 the diaphragm 55 is formed with an integral bush 65 having a bore 66 and the hose 64 is passed over the bush 65 and held thereto by a clip 67.

The manner of using the apparatus illustrated in Figures 9 to 11 is as follows.

The valve 63 having been operated to disconnect the hose 64 from the tank 57, the upper frame 56, with its diaphragm 55 is removed, and the mold assembly is placed on the lower diaphragm 52.

The frame 56 is then moved down on top of the frame 51 and held pressed on to it by hand so that the mold assembly is enclosed between the two diaphragms which yield to accommodate it.

While the frame 56 is held pressed on to the frame 51 the valve 63 is operated to connect the hose 64, and thereby the space between the diaphragms, to the vacuum tank 57, so that the vacuum is applied between the diaphragms and causes them to collapse on to the mold assembly, whereby the two mold halves are pressed together.

When the vacuum has thus been applied for a time sufficient to allow setting of the adhesive between the mating surfaces of the mold halves, the valve 63 is operated to disconnect the hose 64 from the vacuum tank 57, the frame 56, with diaphragm 55 is removed and the mold assembly is taken out.

By means of the invention it is possible to stick together the two halves of each of several molds simultaneously with a single application of pressure or of vacuum by employing an envelope, or a pair of diaphragms as described above, of a size large enough to contain all the mold assemblies which are to be dealt with at one time.

Further it is preferable to provide a pressure or vacuum reservoir which can be quickly placed in communication with the envelope or diaphragm or pair of diaphragms as the case may be containing the mold assembly or assemblies so that the pressure or vacuum can be rapidly applied.

In carrying out the methods according to the invention two different types of adhesives may be employed, namely composite application adhesives or separate application adhesives.

Composite application adhesives comprise resins of the urea-formaldehyde or phenol-formaldehyde or melamine-formaldehyde type admixed with a suitable hardener. The hardener consists of an acidic material by which term we mean a substance which is acidic per se or capable of producing acidity on mixing with the resin. Ammonium salts of mineral or organic acids are very suitable for application as hardeners in composite adhesives. By phenol we mean the phenol $C_6H_5OH$, commercial cresol mixtures containing not less than 30% m-cresol, commercial xylenol mixtures or mixtures of these. To facilitate working with composite adhesives, the proportions of resin and hardener are so chosen as to give a predetermined pot life at a predetermined temperature, for example, a pot life of about 3 to 4 hours at 15° C.

If required the adhesive may contain a filler such as ground mica, to give it the required space filling properties.

The resin and hardener are applied to the mating surfaces of one of the two half molds to be assembled, the other half mold is heated so that when the two are brought together the heat from the second half mold causes rapid setting of the adhesive. The temperature should not, however, be raised to such an extent as to reduce the setting time of the adhesive below three seconds after the assembly of the two halves of the mold, as a setting time shorter than this will mean that the adhesive will set before a joint has had time to form. It may be convenient in some cases to employ for the heated half mold one which has been so recently formed that it retains sufficient heat from its process of formation, thus saving the necessity of reheating.

Separate application adhesives comprise the resins and hardeners as described above and also resins of the resorcinol-formaldehyde type but of which the proportions are such that when the resin and the hardener have been mixed the resulting adhesive has a relatively short pot life and sets relatively rapidly on the application of heat. For example at 70° C. the setting time may be five minutes or less.

The short pot life of such adhesives makes them difficult to use if the resin and hardener are mixed before application. It is, therefore, preferable to apply the resin to one half mold and the hardener to the other half mold so that when the two half molds are assembled the resin and the hardener are brought into contact and setting at once commences. Separate application adhesives may be compounded so as to be used without heat, or they may be compounded so as to be used with heated half molds.

When assembling the two half molds they are usually held in registration by steel dowels which engage in corresponding recesses in the mating surfaces of the half molds at the corners of the latter. When the mold halves are held together during the casting operation by clamps, clips, or like devices, it is necessary to leave the dowels in position during casting, with the result that they are exposed to the risk of distortion or other damage by heat.

By sticking the mold halves together in accordance with the present invention it is possible to break off the corners of the mold assembly, with the dowels therein, before the casting operation takes place, thereby obviating any damage to the dowels due to the heat of the molten metal and facilitating the recovery of them for repeated use.

In order to facilitate breaking off the corners of the mold assembly, each half mold may have a line of weakening formed across each of its corners (as, for example, by means of a scriber) after the half mold has been initially formed by application of the molding mixture to the heated pattern plate and before the half mold has been further heated to complete its setting.

Further to facilitate the breaking off of the corners of the mold assembly and the removal of the dowels therefrom, it is convenient not to apply any adhesive to the portion of the mating faces which it is intended to break off.

We claim:

Apparatus for making a shell mold assembly from two half molds comprising in combination, two rigid members, hinge means connecting said members together to permit one to be swung away from the other, a non self-supporting flexible diaphragm mounted on each member, and means for causing fluid pressure to be applied to the outer faces of the diaphragms, whereby, when the rigid members are brought together with a shell mold assembly between them and the fluid pressure is applied, pressure is applied to the outer surfaces of the mold assembly.

References Cited in the file of this patent

UNITED STATES PATENTS

| | | |
|---|---|---|
| 1,158,389 | Piper | Oct. 26, 1915 |
| 1,190,072 | Aiken | July 4, 1916 |
| 1,909,444 | Worrall | May 16, 1933 |
| 2,054,864 | Owen | Sept. 22, 1936 |
| 2,298,037 | Crandell | Oct. 6, 1942 |
| 2,632,215 | Lee | May 24, 1953 |
| 2,728,122 | McLear | Dec. 27, 1955 |

FOREIGN PATENTS

| | | |
|---|---|---|
| 443,696 | Great Britain | Mar. 4, 1936 |
| 494,885 | Great Britain | Nov. 3, 1938 |

OTHER REFERENCES

Foundry Services Ltd., British, 643,778, Sept. 27, 1950.
The Iron Age, June 26, 1952, pages 112–116.
Modern Metals, October 1950, pages 22–24.